US008526356B2

(12) United States Patent
Nuriyev et al.

(10) Patent No.: US 8,526,356 B2
(45) Date of Patent: *Sep. 3, 2013

(54) TRANSMISSION FORMAT SELECTION FOR OPTIMIZING TRANSMISSION OF DELAY SENSITIVE TRAFFIC

(75) Inventors: Rza Nuriyev, Dallas, TX (US); Ozcan Ozturk, Richardson, TX (US); Ashvin Chheda, Plano, TX (US); David Paranchych, Richardson, TX (US)

(73) Assignee: Research In Motion Limited, Waterloo, Ontario ( * ) Notice: Subject to any disclaimer, the term of this patent is extended or adjusted under 35 U.S.C. 154(b) by 258 days.

This patent is subject to a terminal disclaimer.

(21) Appl. No.: 12/983,692

(22) Filed: Jan. 3, 2011

(65) Prior Publication Data
US 2011/0103362 A1 May 5, 2011

Related U.S. Application Data

(63) Continuation of application No. 11/239,864, filed on Sep. 30, 2005, now Pat. No. 7,864,777.

(51) Int. Cl.
*H04B 7/185* (2006.01)

(52) U.S. Cl.
USPC ........................................................ 370/317

(58) Field of Classification Search
USPC ......... 370/203, 204–215, 229–240, 310–337, 370/338–350, 351–394, 395.1, 395.3, 395.4, 370/395.41, 365.42, 395.5, 395.52, 370/395.53, 412–421, 431–457, 458–463, 370/464–497, 498–522, 521–529
See application file for complete search history.

(56) References Cited

U.S. PATENT DOCUMENTS

| | | | |
|---|---|---|---|
| 6,847,809 B2 | 1/2005 | Gurelli et al. | |
| 7,002,900 B2 | 2/2006 | Walton et al. | |
| 7,027,392 B2 | 4/2006 | Holtzman et al. | |
| 7,113,514 B2 | 9/2006 | Tahernezhaadi et al. | |
| 7,155,170 B2 | 12/2006 | Miyoshi et al. | |
| 7,463,631 B2 | 12/2008 | Bao et al. | |
| 7,554,945 B2 | 6/2009 | Lee et al. | |
| 7,609,671 B1 | 10/2009 | Nuriyev et al. | |
| 7,715,347 B2 | 5/2010 | Yoon et al. | |
| 7,738,419 B2 | 6/2010 | Kwon et al. | |
| 7,864,777 B1 * | 1/2011 | Nuriyev et al. | 370/395.4 |

(Continued)

OTHER PUBLICATIONS

Cdma 2000 High Rate Packet Data Air Interface Specification, 3Gpp2, C.S0024, vol. 4, Oct. 25, 2002, pp. 1-548.

(Continued)

*Primary Examiner* — Jung-Jen Liu
(74) *Attorney, Agent, or Firm* — Fish & Richardson P.C.

(57) ABSTRACT

A method, scheduler, and processor program product for scheduling transmission of packets from a base station to a mobile station. A data rate control index is received from a mobile station. A transmission format is selected using the received data rate control index. The selected transmission format uses a payload size that is smaller than a largest compatible payload size for another transmission format corresponding to the received data rate control index and that is smaller than a total size of packets waiting to be transmitted.

19 Claims, 4 Drawing Sheets

(56) References Cited

U.S. PATENT DOCUMENTS

| | | |
|---|---|---|
| 2004/0038658 A1 | 2/2004 | Gurelli et al. |
| 2004/0066763 A1 | 4/2004 | Hashimoto et al. |
| 2004/0071146 A1 | 4/2004 | Belling |
| 2005/0094675 A1 | 5/2005 | Bhushan et al. |
| 2005/0111397 A1 | 5/2005 | Attar et al. |
| 2005/0143083 A1 | 6/2005 | Kwon et al. |
| 2005/0249133 A1 | 11/2005 | Terry et al. |
| 2005/0281278 A1* | 12/2005 | Black et al. .................. 370/412 |
| 2006/0094367 A1 | 5/2006 | Miyoshi et al. |
| 2006/0176881 A1 | 8/2006 | Ma et al. |
| 2006/0251016 A1 | 11/2006 | Lee et al. |
| 2007/0022396 A1 | 1/2007 | Attar et al. |
| 2007/0066235 A1* | 3/2007 | Padovani et al. ........... 455/67.13 |
| 2007/0070952 A1 | 3/2007 | Yoon et al. |
| 2007/0071030 A1 | 3/2007 | Lee |
| 2007/0081500 A1 | 4/2007 | Jung et al. |
| 2007/0109967 A1 | 5/2007 | Ha |
| 2007/0121535 A1 | 5/2007 | Chen et al. |
| 2008/0159219 A1 | 7/2008 | Choi et al. |

OTHER PUBLICATIONS

STD-T64-C.20024.V4.0, cdma2000 High Rate Packet Data Air Interface Specification, Oct. 2002, ARIB, pp. 1-560.

USPTO Office Action for U.S. Appl. No. 11/241,557 dated Jan. 14, 2009.

USPTO Notice of Allowance for U.S. Appl. No. 11/241,557 dated Jun. 16, 2009.

USPTO Office Action for U.S. Appl. No. 11/239,864 dated Oct. 2, 2008.

USPTO Office Action for U.S. Appl. No. 11/239,864 dated Jun. 19, 2009.

USPTO Final Office Action for U.S. Appl. No. 11/239,864 dated Dec. 3, 2009.

USPTO Office Action for U.S. Appl. No. 11/239,864 dated Mar. 24, 2010.

USPTO Notice of Allowance for U.S. Appl. No. 11/239,864 dated Aug. 27, 2010.

* cited by examiner

| DRC INDEX | TRANSMISSION FORMATS |
|---|---|
| 0 OR 1 | 522 ~ [4] → (128, 16, 1024)<br>(256, 16, 1024) ⁄ 520<br>(512, 16, 1024)<br>(1024, 16, 1024) ⁄ 502 |
| 2 | 526 ~ [2] → (128, 8, 512)<br>(256, 8, 512) ⁄ 524<br>(512, 8, 512)<br>(1024, 8, 512) ⁄ 504 |
| 3 | 530 ~ [1] → (128, 4, 256)<br>(256, 4, 256) ⁄ 528<br>(512, 4, 256)<br>(1024, 4, 256) ⁄ 506 |
| 4 | (128, 2, 128)<br>(256, 2, 128) ⁄ 532<br>534 ~ [1] → (512, 2, 128)<br>(1024, 2, 128) ⁄ 508 |
| 5 | 538 ~ [1] → (512, 4, 128) ⁄ 536<br>(1024, 4, 128)<br>(2048, 4, 128) ⁄ 510 |
| 6 | (128, 1, 64)<br>(256, 1, 64)<br>(512, 1, 64)<br>540 ~ [1] → (1024, 1, 64) ⁄ 512 |
| 7 | 542 ~ [1] → (512, 2, 64)<br>(1024, 2, 64)<br>(2048, 2, 64) ⁄ 514 |
| 8 | 544 ~ [2] → (1024, 2, 64)<br>(3072, 2, 64) ⁄ 516 |
| 9 | (512, 1, 64)<br>(1024, 1, 64)<br>546 ~ [1] → (2048, 1, 64) ⁄ 518 |
| 11 | 548 ~ [1] → (1024, 1, 64)<br>(3072, 1, 64) ⁄ 520 |

*FIG. 5*

TRANSMISSION FORMAT SELECTION FOR OPTIMIZING TRANSMISSION OF DELAY SENSITIVE TRAFFIC

This application is a continuation of application Ser. No. 11/239,864, filed Sep. 30, 2005, now U.S. Pat. No. 7,864,777.

FIELD OF THE INVENTION

The present invention relates generally to communications and in particular to a method and apparatus for transmitting data in a communications system. Still more particularly, the present invention relates to a method and apparatus for transmitting delay sensitive data in a time-shared communications system.

BACKGROUND OF THE INVENTION

In a wireless communications system many types of traffic are present. One type of traffic sent over a wireless communications system is data. Data is bursty by nature. Examples of data sent over a wireless communications system are e-mail messages and text messages. Delay sensitive traffic is a more common form of data sent over a wireless communications system. Voice communications is an example of delay sensitive traffic. The difference between voice and data is that voice is a real time application that has minimal tolerance for conditions such as delay, and more tolerance for packet loss. In a communications system, voice is packetized. In other words, the conversation is digitized and encapsulated into a packet. These packets are transported across networks and transmitted to mobile stations.

Scheduling is employed to manage delay sensitive traffic in a time-shared wireless communications system. For delay sensitive traffic, the end-to-end delay should be within a certain bound to satisfy quality criteria dictated by quality of service requirements.

As a general rule in wireless communications systems, packets with a queuing delay at a transmitting station that exceeds a pre-determined amount of time are discarded. As a result, packet loss occurs, which eventually gives rise to user outage or, at the very least, reduced and/or unacceptable quality.

The current scheduling systems are often unable to maintain the necessary quality of service needed to prevent gaps in conversations. Latency is the average time it takes for a packet to reach a destination from the source. The typical amount of latency for a voice call is 100 milliseconds. Packet loss occurs when packets are dropped by the wireless communications system when too much latency is present for a packet. In the case of dropped voice packets, the packets are discarded and not retransmitted. Typically, voice traffic can tolerate up to a three percent loss of packets before callers experience disconcerting gaps in conversation. A one percent drop or less in voice packets is optimal.

Therefore, it would be advantageous to have an improved method, apparatus, and computer usable program code for scheduling the transmission of delay sensitive traffic to a mobile station.

SUMMARY OF THE INVENTION

A method, scheduler, and processor program product for scheduling transmission of packets from a base station to a mobile station is provided. A data rate control index is received from a mobile station. A transmission format is selected using the received data rate control index. The selected transmission format uses a payload size that is smaller than a largest compatible payload size for another transmission format corresponding to the received data rate control index and that is smaller than a total size of packets waiting to be transmitted.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 5 is a table illustrating transmission formats for particular data rate control indexes in accordance with an illustrative embodiment of the present invention;

DETAILED DESCRIPTION OF THE PREFERRED EMBODIMENT

Figure 1:
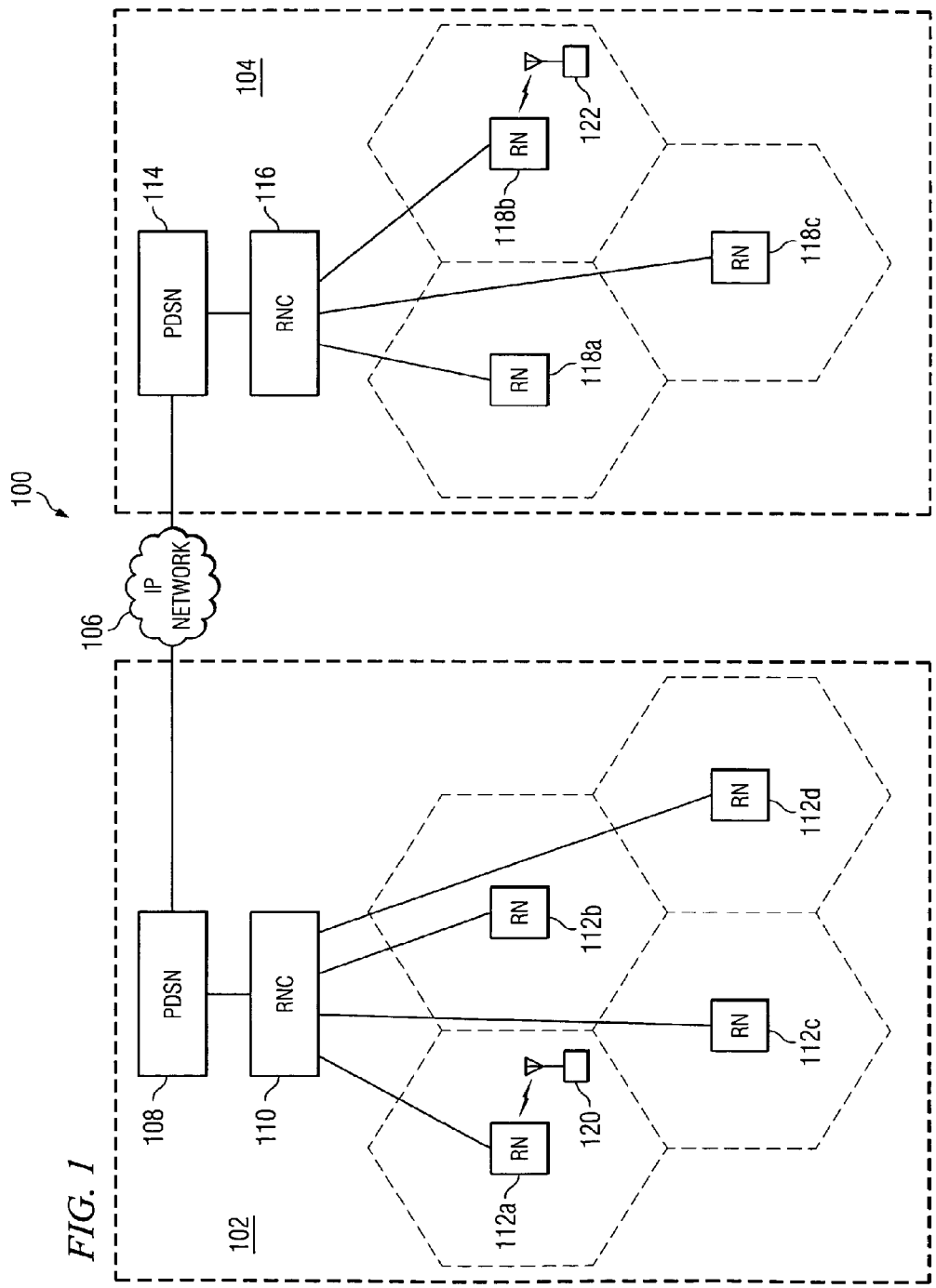
FIG. 1 is a communications system depicted in accordance with an illustrative embodiment of the present invention.

With reference now to the figures and in particular with reference to FIG. 1, a communications system is depicted in accordance with an illustrative embodiment of the present invention. Communications system 100 is an example of a communications system in which the aspects of the present invention may be implemented. In this example, packet data communications system 100 includes wireless communications systems in the form of cellular system 102 and cellular system 104, each covering a different geographical region. Communications system 100 also is referred to as a "radiotelephone network". In the interest of clarity, FIG. 1 depicts only two such cellular systems. In addition, also depicted in communications system 100 is Internet Protocol (IP) network 106. Cellular systems 102 and 104 are CDMA wireless communications systems in the depicted example. Alternatively, other types of communications systems, such as, for example, an advanced mobile phone system (AMPS) or time division multiple access (TDMA) may be used in cellular system 102 or cellular system 104.

Packet data Cellular system 102 includes packet data serving node (PDSN) 108, radio network controller (RNC) 110 with a number of radio networks (RN) 112*a*-112*d* (a radio network is also referred to as a base transceiver station (BTS)). RNC 110 and associated RNs 112*a*-112*d* form a radio access network (RAN). Similarly, cellular system 104 includes PDSN 114, RNC 116 and RNs 118a-118c. RNC 116 and RNs 118a-118c also form a radio access network.

PDSN 108 and PDSN 114 are coupled to IP Network 106.

RNC 110 and RNC 116 function to locate mobile systems to the cell with the highest signal strength (handoff) and perform call setup, call supervision, and call termination. In addition, these RNCs perform remotely ordered equipment testing, updates, location information of mobile stations, and provide data transmission interfaces between itself and the PDSN.

RNs 112a-112d and RNs 118a-118c are cell site equipment used to communicate with mobile stations, such as mobile stations 120 and 122. These mobile stations are also called "mobile communications units" or "radiotelephones" and may be, for example, a cellular phone. A RN provides RF radiation transmission and reception with an appropriate channel access mechanism, such as, TDMA, CDMA, or AMPS. In addition, a RN provides voice and data transmission interfaces between itself and the RNC. A RN consists of several receive and transmit antennas, an RF distributor, modulators and demodulators, and T1/E1 trunkline interfaces for voice and data traffic. In CDMA systems, a global positioning system receive antenna also is included in the RN. FIG. 1 illustrates four source RNs (112a-112d) and three target RNs (118a-118c). Of course, other numbers of RNs may be employed for source and target systems. Additionally, in the depicted example, RNCs 110 and 116 are separate from PDSNs 108 and 114. Alternatively, PDSNs with integral controllers and routers may be employed according to the present invention.

When source mobile station 120 initiates a call, a determination is made as to whether the target system is a mobile station, such as mobile station 122 or a fixed station or land line station, such as a computer attached to IP network 106. The communications path extends from RN 112a to RNC 110 and from RNC 110 to PDSN 108. In turn, PDSN 108 establishes a communications path with IP network 106 to generate a communications path to the target mobile station.

The aspects of the present invention are particularly useful for transmitting delay sensitive traffic, such as voice over IP, real time video, and stock market data. The different aspects of the present invention focus on solving transmission system problems in handling delay sensitive traffic.

Currently available scheduling systems are primarily designed for throughput optimizations. Although throughput and delay are not completely independent, optimization of throughput does not necessarily translate into the reduction of delay. The aspects of the present invention reduce the amount of delay through a scheduler that selects a transmission format to reduce the delay in the queuing system. This type of process does not require changing priority processes.

Figure 2:
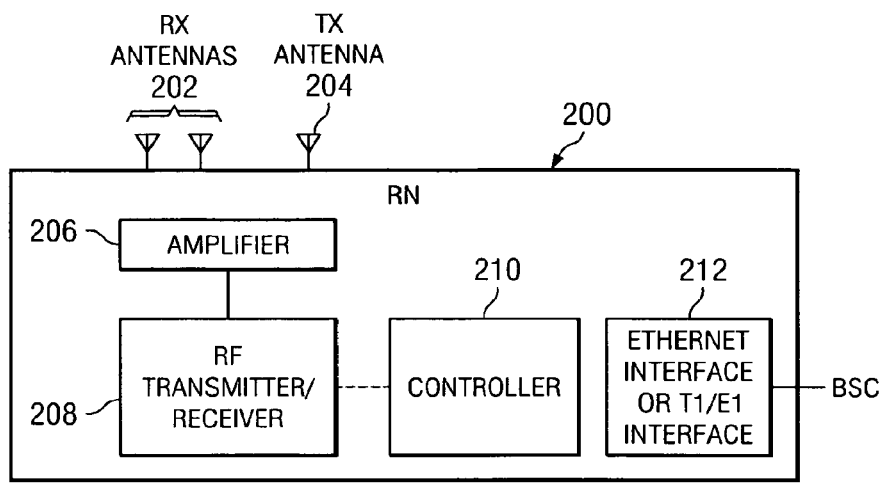
FIG. 2 is a functional block diagram of a base transceiver station in accordance with an illustrative embodiment of the present invention.

With reference now to FIG. 2, a functional block diagram of a radio network (RN) is depicted in accordance with an illustrative embodiment of the present invention. RN 200 includes receiver antennas 202 and transmitter antenna 204. RN 200 includes amplifier 206 used to amplify the signal for broadcasting in the forward link. Low noise amplifiers (LNA) are used to amplify the signal on the reverse link. RF transmitter/receiver 208 is located within BTS 200 and is employed to send signals to amplifier 206 to transmit antenna 204 with power amplifiers within amplifier 206 boosting the modulated signals to high power signals. RF transmitter/receiver 208 also is used to receive signals from mobile stations via receiver antennas 202 and amplifier 206.

Controller 210 is used to maintain an independent setup channel for shared use of the RN and communicating with all mobile stations within the zone or sector of the RN. Controller 210 may be implemented within a data processing system including components, such as, for example, a microprocessor, a memory, and a storage device. The microprocessor may be a digital signal processor (DSP) depending on the implementation. Controller 210 in the depicted example may be used to implement the RTD estimation functions of the present invention. Controller 210 within RN 200 includes functions, such as an overhead channel manager and a call resource manager to manage channels and various resources and processing calls from mobile stations.

Figure 3:
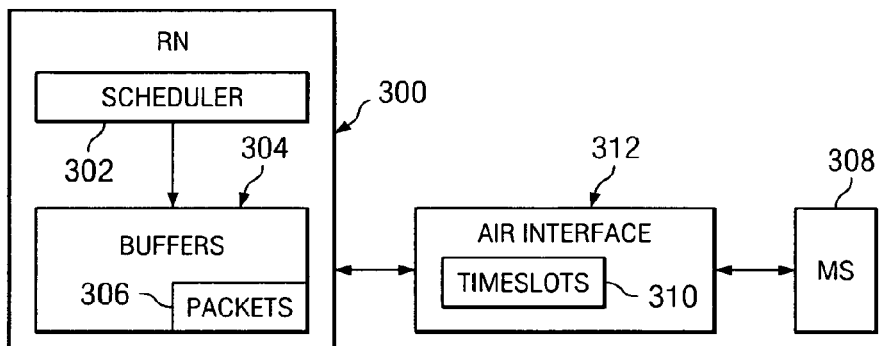
FIG. 3 is a diagram illustrating components used in reducing delay in the transmission of packets stored in queues or buffers in accordance with an illustrative embodiment of the present invention.

Turning now to FIG. 3, a diagram illustrating components used in reducing delay in the transmission of packets stored in queues or buffers is depicted in accordance with an illustrative embodiment of the present invention. In this example, base transceiver station 300 contains scheduler 302 and buffers 304. Scheduler 302 is a software process that is used to perform various functions to schedule the transmission of data. For example, scheduler 302 assigns priorities to users at every time slot. In other words, scheduler 302 chooses a user with maximum priority to transmit for a particular time slot. Further, scheduler 302 also identifies transmission formats for use in sending data to mobile stations in a forward link. The processes for scheduler 302 may be executed by a processor, such as a digital signal processor within base transceiver station 300. Buffers 304 serve as queues for traffic such as packets 306 located in buffers 304. In particular, scheduler 302 may be located in a base transceiver station such as base transceiver station 200 in FIG. 2. In this example, packets 306 are sent to mobile station 308 in time slots 310 over air interface 312. The aspects of the present invention maximize the transmission of packets 306 over time slots 310 to mobile station 308. In these examples, transmission formats are selected in a manner different from those in currently used systems.

In a forward link, the traffic is sent from base transceiver station 300 to mobile station 308 over air interface 312, mobile station 308 specifies a 4-bit integer called a data rate control (DRC) index for use in accessing the wireless communications system based on channel conditions. This forward link, as well as other transmissions, is implemented using Evolution Data Optimized (EV-DO) Revision A Standard (DORA). The formal name of this standard is 3GPP2 C.S0024 Version 4.0 CDMA2000 High Rate Packet Data Air Interface Specification. The data rate control index is set in DORA. This protocol is a wireless radio band data protocol in which data rate control indexes are specified by mobile stations for use by a base transceiver station in transmitting data over time slots to the mobile stations.

Figure 4:
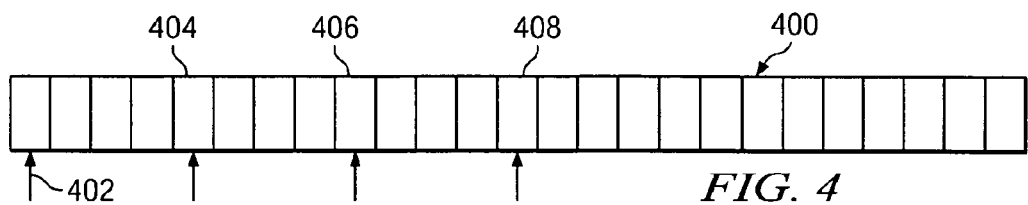
FIG. 4 is a diagram illustrating time slots in accordance with an illustrative embodiment of the present invention.

Turning now to FIG. 4, a diagram illustrating time slots is depicted in accordance with an illustrative embodiment of the present invention. Time slots 400 are examples of time slots within time slots 310 in FIG. 3. Time slots 400 are shown to illustrate interlacing in the transmission of data over time slots. For example, if data is to be sent over four time slots, the data will be sent in time slots 402, 404, 406, and 408. The data is sent only every four time slots in this example. The time slots in between these are reserved for other users and purposes.

The aspects of the present invention reduce the number of time slots needed to transmit the data. If a smaller amount of data is sent over a time slot, then the transmission may terminate after time slot 402 or time slot 404, rather than requiring the use of all four time slots transmission. When a mobile station receives data in a time slot, the mobile station begins decoding symbols in the data received in the time slot. This decoding of symbols is performed to reproduce the voice conversation in the transmission for the user. If the mobile station does not complete decoding the data, the data is sent again in a subsequent time slot to the mobile station. This resending of data continues for the number of time slots indicated by a transmission format.

For example, a transmission format may designate that the data is to be sent over four time slots. In other words, the data is repeated four times for that particular transmission format. With interlacing, the time taken actually requires additional time slots because the mobile station has to wait for its time slot because of interlacing in these examples. A hybrid automated repeat request system is implemented allowing the mobile station to terminate the transmission of data earlier if the decoding occurs at an earlier point in time.

In this example, data is transmitted to the mobile station at time slot 402. At that time, the mobile station begins decoding the symbols. If the mobile station does not finish decoding the symbols before it is time to transmit data in time slot 404, the data is again transmitted at time slot 404. The decoding continues and transmission of data may occur at time slots 406 and 408. By the time data is transmitted at time slot 408, the decoding should finish based on the transmission format identified from the data rate control index sent by the mobile station.

By sending less data or symbols, the mobile station is likely to finish decoding the data before the data is transmitted a fourth time in time slot 408. In fact, if the mobile station finishes decoding data transmitted during time slot 402, the mobile station sends an acknowledgement or signal indicating that decoding has completed. In this case, the base transceiver station does not transmit data over the subsequent time slots defined for the transmission format. Instead, these time slots are now open for other uses. Further, the amount of time needed to transmit all of the data is reduced. For example, if all of the data is decoded after time slot 402, only one time slot is used.

If the data does not decode until after time slot 408, a total of thirteen time slots are required to transmit the data because of interlacing. Depending on how long the data has been present in the buffer for the particular mobile station, packets may be dropped or lost over this period of time. In many cases, multiple packets from a buffer for a user are placed into a single payload to be transmitted over a time slot. Further, some of these packets may have been present for a much longer time than other packets in the buffer. As a result, if all four time slots are needed, the packets may be dropped and the data lost before the decoding completes. If the packets are dropped from the buffer, then gaps occur because this type of delay sensitive data is not retransmitted. In these illustrative examples, data is not considered to have been transmitted to the mobile station until the mobile station has completed decoding of the data. By sending smaller amounts of data, the decoding is likely to occur sooner by the mobile station. As a result, data packets are less likely to be dropped and lost.

The amount of data and the maximum number of time slots over which a data packet is transmitted depends on the particular transmission format. The aspects of the present invention increase the likelihood that fewer time slots are needed to transmit the data to mobile station. In this manner, the total transmission time is reduced because the mobile station is able to decode the data in less time.

According to the standard, there are several transmission formats (T×F) that correspond to the same data rate control index. These transmission formats only differ in the size of the payload, and the one with the highest payload is called a canonical transmission format. A transmission format (T×F) of the forward traffic channel is represented by an ordered triple of numbers (K, s, P), whose components are defined as follows: (1) physical layer packet size in bits or payload (K); (2) nominal transmit duration in the number of slots (s); and (3) preamble length in bits (P).

The physical layer packet size or payload is the total number of bits in the physical layer packet: {128, 256, 512, 1024, 2048, 3072, 4096, 5120}. The nominal transmit duration is the maximum number of time slots over which the physical layer packet is transmitted {1, 2, 4, 8, 16}. The number of chips of the packet preamble preceding the transmission of the packet is the number of chips of the packet preamble, which precedes the transmission of the packet {64, 128, 256, 512, 1024}. A chip is also referred to as a pulse with respect to transmission of data.

Because four-slot interlacing is used in these illustrative examples, a transmission format with nominal transmit duration of n time slots can actually take up to 4n−3 time slots to finish the transmission. Depending on the implementation, the interlacing may take place using other numbers of time slots other than four. Hybrid automatic repeated request (ARQ) allows for early termination, resulting in the higher final rate. For a T×F (K, s, P), K information bits are encoded, modulated, and spread into 1600*s−P chips over s time slots, which are transmitted with a three-slot interval between them. The first time slot carries 1600-P chips combined with P preamble chips, and the remaining s−1 time slots carry 1600 data chips each. The data rate of a transmission format is taken to be K/s (bits/time slot), and the nominal data rate of the data rate control index is taken to be the data rate of the corresponding canonical transmission format.

The aspects of the present invention select a transmission format in the forward link of the DORA standard. When a mobile station sends a data rate control index to the radio access network, it is implied that all the corresponding transmission formats can be supported by that mobile station, and the choice of which transmission format to use given a data rate control index value is at the full discretion of the radio access network controller such as a base transceiver station. This flexibility in transmission format choice can be utilized to the advantage of delay sensitive traffic.

In general, non-canonical transmission formats are chosen only when the data in the selected user's buffer is not sufficient to fill the frame of the canonical transmission format. A non-canonical transmission format is a transmission format with a smaller payload. The aspects of the present invention recognize that while such a transmission format choosing scheme is good for efficiency, this scheme is nonetheless geared toward throughput-oriented traffic. As such, this type of transmission format selection scheme does not take into account the delay considerations.

The aspects of the present invention deliberately choose transmission formats with smaller payloads than would be selected by the currently used transmission format selection schemes. Although the nominal rate of such formats is less than that of the canonical one, the fact that channel conditions can support the canonical transmission format implies that with high probability, non-canonical transmission formats will have strictly early termination of transmission through hybrid automatic repeated request. Care is taken when downgrading to a smaller payload to not sacrifice the over-the-air rate. This way a shorter transmission time is achieved without any loss in the transmission rate. Note that the power level required to support a transmission format depends exclusively on its spectral efficiency and also because of the finite code lengths on the payload size. The power level required is an increasing function of spectral efficiency and a decreasing function of the payload size. The effect of the latter on the required power level is minute compared to that of the former, especially at payload sizes used in DORA. The nominal spectral efficiency of a T×F (K, s, P) is $$\xi(K, s, P) = \frac{K}{1600 \cdot s - P} \text{ (bits/channel use)},$$

and with early termination at time slot r<s, the effective spectral efficiency increases to $$\xi(K, r, P) = \frac{K}{1600 \cdot r - P} \text{ (bits/channel use)}$$

Now consider two T×F's (K, s, P) and (K/m, s, P), that correspond to the same data rate control index. Obviously, the nominal spectral efficiency of the former is m times that of the latter. However, for T×F (K/m, s, P) with early termination at time slot r=s/m we have $$\xi(K/m, r, P) = \frac{K/m}{1600 \cdot r - P} = \frac{K}{1600 \cdot s - P \cdot m} > \frac{K}{1600 \cdot s - P} = \xi(K, s, P)$$

As the preamble size, P, is strictly positive, the spectral efficiency of the smaller payload transmission format with early termination is bigger, and as such requires more power level to support than the canonical T×F (K, s, P). However, observe that the relative difference in efficiency is only $$\frac{\xi(K/m, r, P) - \xi(K, s, P)}{\xi(K, s, P)} = \frac{(m-1)P}{1600 \cdot s - P \cdot m} = \frac{m-1}{m} \cdot \frac{P}{1600 \cdot r - P}$$

which by proper choice of r can be made small enough to meet the needs of a particular implementation. Observe that, r denotes the expected termination time slot, and m is the degree of downgrading performed.

Turning now to FIG. 5, a table illustrating transmission formats for particular data rate control indexes are depicted in accordance with an illustrative embodiment of the present invention. In this example, table 500 only shows entries for data rate control indexes that have more than one compatible transmission format. Data rate control indexes 10, 12, 13, and 14 are not shown because they have only a single format. In table 500, the canonical transmission format is illustrated with the downgraded format that is to be used to increase the rate of transmission. In this case, table 500 shows all of the data rate control indexes that have more than one compatible transmission format. In table 500, each row corresponds to a data rate control index in which each data rate control index has more than one transmission format that may be used to transmit data from the base transceiver station to a mobile station through a forward link over a forward traffic channel. As described above, each entry contains a physical layer packet size or payload, a nominal transmit duration, and a preamble length. In these examples, the number in the brackets is an identifier indicating the number of timeslots that is expected to be used to transmit the data.

In this table, transmission formats 502, 504, 506, 508, 510, 512, 514, 516, 518, and 520 are canonical formats defining the largest packet size for transmission in a time slot. For data rate control index of 0 or 1, transmission format 520 is identified as the downgraded transmission format to be used to transmit data when a mobile station sends a data rate control index of 0 or 1. Identifier 522 indicates that the transmission is expected to terminate after four time slots. In other words, the mobile station should be able to decode the data using a 256 bit packet size within four time slots rather than the sixteen as identified for this particular data rate control index. As a result, the process of placing packets into a payload and sending the payload over a time slot has to be repeated only four times, rather than sixteen times before the mobile station decodes the data.

For a data rate control index of 2, transmission format 524 is used in which indicator 526 indicates that the transmission of data should terminate after two time slots. For a data rate control index of 3, transmission format 528 is used with indicator 530 indicating that the transmission should terminate after one time slot. Transmission format 532 is used when the mobile station returns a data rate control index of 4. In this case, the transmission should terminate after one time slot as indicated by indicator 534. For a data rate control index of 5, transmission format 536 is used with the termination of the transmission expected to occur after one time slot is identified by indicator 538.

For data rate control indexes of 6, 7, 8, 9, and 11 in table 500, the canonical transmission formats are the same as the selected ones for downgrading. In other words, no change in format occurs for these data rate control indexes. Additionally, indicators 540, 542, 544, 546, and 548 indicate that the expected termination for the decoding does not occur earlier than the number of time slots allotted by the transmission format for these data rate control indexes. In these examples, most of the data rate control indexes indicate that the data may be transmitted in a single timeslot.

Figure 6:
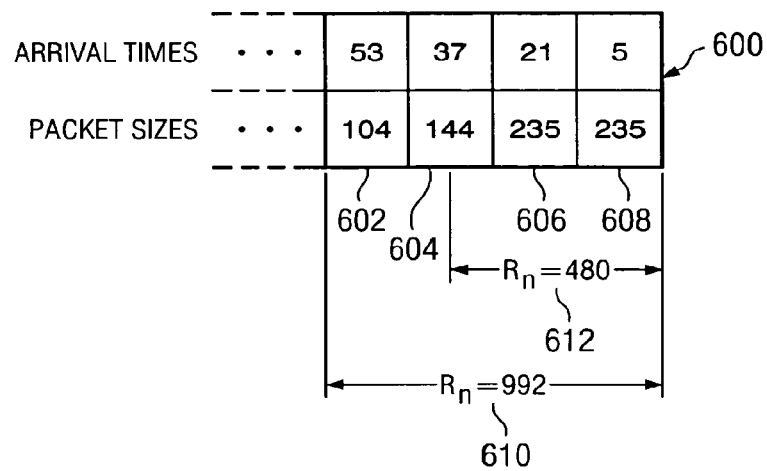
FIG. 6 is a diagram illustrating a buffer for a user in accordance with an illustrative embodiment of the present invention.

Turning now to FIG. 6, a diagram illustrating a buffer for a user is depicted in accordance with an illustrative embodiment of the present invention. In this example, buffer 600 contains packets 602, 604, 606, and 608. Each of the packets has a particular size and arrival time. Packet 602 has an arrival time of 53 milliseconds with a packet size of 104 bits; packet 604 has an arrival time of 37 milliseconds with a size of 144 bits; packet 606 has an arrival time of 21 milliseconds with a size of 235 bits; and packet 608 has an arrival time of 5 milliseconds with a size of 235 bits. In this example, packet 608 is the oldest packet because this packet has the earliest arrival time.

In these examples, a packet is maintained within buffer 600 only for 70 milliseconds. Thereafter, the packets are dropped from buffer 600. 70 milliseconds is used for the buffer assuming that 30 milliseconds may have passed since a packet was transmitted from the source to the buffer.

In this depicted example, the mobile station has indicated that it can support a data rate control index of 4. A canonical transmission format for this example is 1024 bits using two time slots. Due to the interlacing of transmission as illustrated above, five time slots are needed to send packets 602, 604, 606, and 608. The payload sent in a time slot is 1024 bits minus 32 overhead bits to form 992 bits as shown in section 610.

Using the different mechanisms of the present invention, the transmission format is downgraded to use 512 bits over two time slots in this illustrative example. This payload size is identified using table 500 in FIG. 5 in these examples. With the expected termination of only one time slot, only a single time slot is needed to send a payload of 480 bits. In these examples, the 512 payload is reduced by 32 bits for overhead needed to send the data. The 480 bits are sent over one time slot as shown in section 612.

Packets 606 and 608 are placed into a single payload rather than placing packets 602, 604, 606, and 608 into a larger payload for transmission over a time slot. One time slot is used to send these two packets because the smaller payload size results in the mobile station decoding the data earlier. As a result, the data does not need to be repeated over subsequent time slots.

As a result, packets 606 and 608 are sent within one time slot rather than trying to send packets 602, 604, 606, and 608 over five time slots. The reduced number of time slots results in reduced time to send data sensitive traffic to a mobile station. As can be seen, data packet 608 is in danger of being dropped if too much time is taken to send this particular data packet. When this data packet is grouped with more data, additional time slots are needed to send this packet along with data from the other data packets. Thus, in this example, with the mechanism of the present invention, only a single time slot is needed in this example, reducing the possibility that data packet 608 will be dropped. In other cases, more than one time slot may be needed, but the aspects of the present invention select the transmission format so that the actual number of time slots needed to decode the data is less than the transmission format currently selected by current transmission format selection processes as described above.

Figure 7:
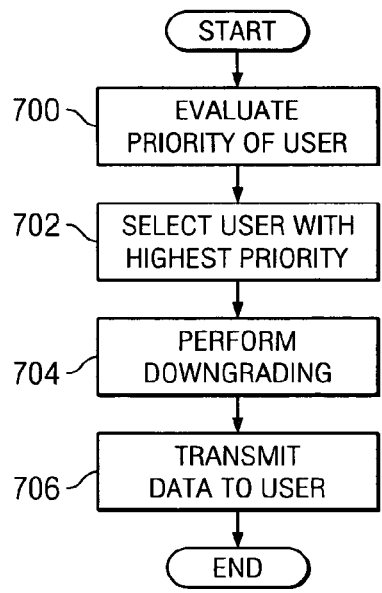
FIG. 7 is a flowchart of a process for sending data to a mobile station in accordance with an illustrative embodiment of the present invention.

Turning next to FIG. 7, a flowchart of a process for sending data to a mobile station is depicted in accordance with an illustrative embodiment of the present invention. The process illustrated in FIG. 7 may be implemented in a scheduler, such as scheduler 302 in FIG. 3.

The process begins by evaluating the priority of users (step 700). This priority is identified using transmission format and an identification of the user. In these illustrative examples, the user is a user associated with a particular mobile station. The actual priority mechanism or algorithm used may vary depending on the particular implementation. Next, the user with the highest priority is selected (step 702). Downgrading of the transmission format is performed for the selected user (step 704). Thereafter, the data is transmitted to the user with the downgraded transmission format (step 706) with the process terminating thereafter. The transmission format and the identification of the packets to be sent are provided by the scheduler to the transmission circuitry to send the data to the user.

Figure 8:
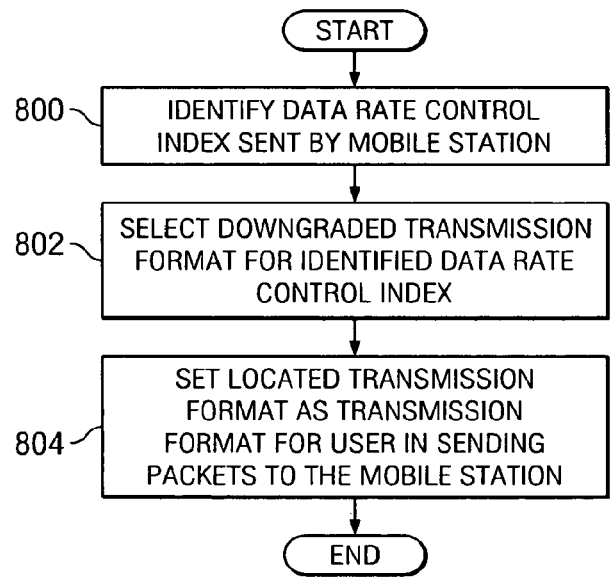
FIG. 8 is a flowchart of a process for performing downgrading in accordance with an illustrative embodiment of the present invention.

Turning next to FIG. 8, a flowchart of a process for performing downgrading is depicted in accordance with an illustrative embodiment of the present invention. The process illustrated in FIG. 8 is a more detailed description of step 704 in FIG. 7.

The process begins by identifying a data rate control index sent by the mobile station associated with the user (step 800). A downgraded transmission format is selected for the identified data rate control index (step 802). In these examples, this downgraded transmission format may be identified from a data structure, such as table 500 in FIG. 5. The located transmission format is set as the transmission format for user in sending packets to the mobile station for the user (step 804) with the process terminating thereafter.

The following are some example cases illustrating downgrading transmission formats to a lower format than that of a canonical transmission format.

Case I. Small Preamble (P=64, 128 or 256): Given a canonical T×F (K, s, P) choose T×F (K/s, s, P) to be used in the next time slot (this choice corresponds to m=s and r=1). Based on discussion above, this choice of payload will result in early termination in the first time slot (with high probability). In this situation, the worst case happens for data rate control index of 3 (canonical T×F (1024, 4, 256)) when the power penalty is 0.57 dB, whereas the best case happens for data rate control index of 7 (canonical T×F (2048, 2, 64)) when the power penalty is less than 0.05 dB.

Case II. Larger Preamble (P=512 or 1024): Given a canonical T×F (K, s, P) choose T×F (2*K/s, s, P) to be used in the next time slot (this choice corresponds to m=s/2 and r=2). Similarly, this choice of payload will result in early termination in the second transmitted time slot (with high probability). In this case, the power penalty is about 0.46 dB.

The downgrading of the canonical transmission formats is critical since it reduces the total transmission time. For Case I, this downgrading reduces the transmission time to only a single time slot from otherwise possible 13 time slots for data rate controls 3 and 5 or 5 time slots for data rate controls 4 and 7. Likewise, for Case II, transmission time is reduced to 5 time slots with 2-slot transmission from possible 61 time slots for data rate controls 0 and 1 or 29 time slots for data rate control 2.

As mentioned above, downgrading results in about 0.5 dB increase in the required power level at the access terminal. Because of the dynamic margin update algorithm utilized at the access terminal this difference in power level will be quickly incorporated into the appropriate data rate control selection thresholds in a few (1-2) margin increases, and thus continued use of this downgrading scheme will force access terminals to adjust to the currently used transmission formats.

Thus, the present invention provides an improved method, apparatus, and computer usable program code for reducing the delay or latency in sending data packets. The aspects of the present invention reduce latency through downgrading the transmission format used to send data packets to a user at a mobile station. By reducing the transmission format, the number of time slots needed to send data is reduced.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of scheduling transmission of packets from a base station to a mobile station, the method comprising:
   receiving a data rate control index from a mobile station; and
   selecting a transmission format using the received data rate control index, wherein the selected transmission format uses a payload size that is smaller than a largest compatible payload size for another transmission format corresponding to the received data rate control index, and smaller than a total size of packets waiting to be transmitted;
   wherein the transmission format has a number of time slots less than a number of time slots of the another transmission format to have a spectral efficiency greater than a spectral efficiency of the another transmission format.

2. A method as defined in claim 1, further comprising transmitting the packets to the mobile station using the selected transmission format.

3. A method as defined in claim 1, wherein said another transmission format is a canonical transmission format for the received data rate control index.

4. A method as defined in claim 1, wherein the packets include delay-sensitive packets.

5. A method as defined in claim 4, wherein the packets include voice data packets.

6. A method as defined in claim 1, wherein the selecting step comprises searching a data structure containing data transmission formats using the received data rate control index to select a data transmission format from a plurality of data transmission formats corresponding to the received data rate control index.

7. A method as defined in claim 2, wherein the selected transmission format identifies a number of time slots over which the packets are to be transmitted and wherein the transmitting step comprises:
   placing data from a number of packets in a payload having the payload size to form a completed payload in the selected transmission format;
   transmitting the completed payload in a selected time slot;
   re-transmitting the completed payload in subsequent time slots as identified by the selected transmission format; and
   halting re-transmission of the completed payload if the mobile station acknowledges decoding of the completed payload.

8. A scheduler for scheduling transmission of packets from a base station to a mobile station, the scheduler comprising:
   a port operable to receive a data rate control index from a mobile station; and
   a selector operable to select a transmission format using the received data rate control index, wherein the selected transmission format uses a payload size that is smaller than a largest compatible payload size for another transmission format corresponding to the received data rate control index smaller than a total size of packets waiting to be transmitted and selected to reduce transmission time of packets by reducing a number of time slots expected to be used to decode the packets;
   wherein the transmission format has a number of time slots less than a number of time slots of the another transmission format to have a spectral efficiency greater than a spectral efficiency of the another transmission format.

9. A scheduler as defined in claim 8, wherein said another transmission format is a canonical transmission format for the received data rate control index.

10. A scheduler as defined in claim 8, wherein the packets include delay-sensitive packets.

11. A scheduler as defined in claim 10, wherein the packets include voice data packets.

12. A scheduler as defined in claim 8, wherein the selector is operable to search a data structure containing data transmission formats using the received data rate control index to select a data transmission format from a plurality of data transmission formats corresponding to the received data rate control index.

13. A processor program product comprising a non-transitory processor-readable medium encoded with processor-executable instructions for scheduling transmission of packets from a base station to a mobile station, the instructions comprising:
   instructions executable to receive a data rate control index from a mobile station; and
   instructions executable to select a transmission format using the received data rate control index, wherein the selected transmission format uses a payload size that is smaller than a largest compatible payload size for another transmission format corresponding to the received data rate control index, and smaller than a total size of packets waiting to be transmitted;
   wherein the transmission format has a number of time slots less than a number of time slots of the another transmission format to have a spectral efficiency greater than a spectral efficiency of the another transmission format.

14. A product as defined in claim 13, further comprising instructions executable to cause transmission of the packets to the mobile station using the selected transmission format.

15. A product as defined in claim 13, wherein said another transmission format is a canonical transmission format for the received data rate control index.

16. A product as defined in claim 13, wherein the packets include delay-sensitive packets.

17. A product as defined in claim 16, wherein the packets include voice data packets.

18. A product as defined in claim 13, wherein the selecting step comprises searching a data structure containing data transmission formats using the received data rate control index to select a data transmission format from a plurality of data transmission formats corresponding to the received data rate control index.

19. A product as defined in claim 14, wherein the selected transmission format identifies a number of time slots over which the packets are to be transmitted and wherein the instructions executable to cause transmission of the packets comprise:

instructions executable to place data from a number of packets in a payload having the payload size to form a completed payload in the selected transmission format;

instructions executable to transmit the completed payload in a selected time slot;

instructions executable to re-transmit the completed payload in subsequent time slots as identified by the selected transmission format; and instructions executable to halt re-transmission of the completed payload if the mobile station acknowledges decoding of the completed payload.

* * * * *